(No Model.) 2 Sheets—Sheet 1.
W. T. HILDRUP, Jr.
REGULATING THE SUPPLY OF LIQUIDS TO RETORTS OR GAS GENERATORS.
No. 362,081. Patented May 3, 1887.
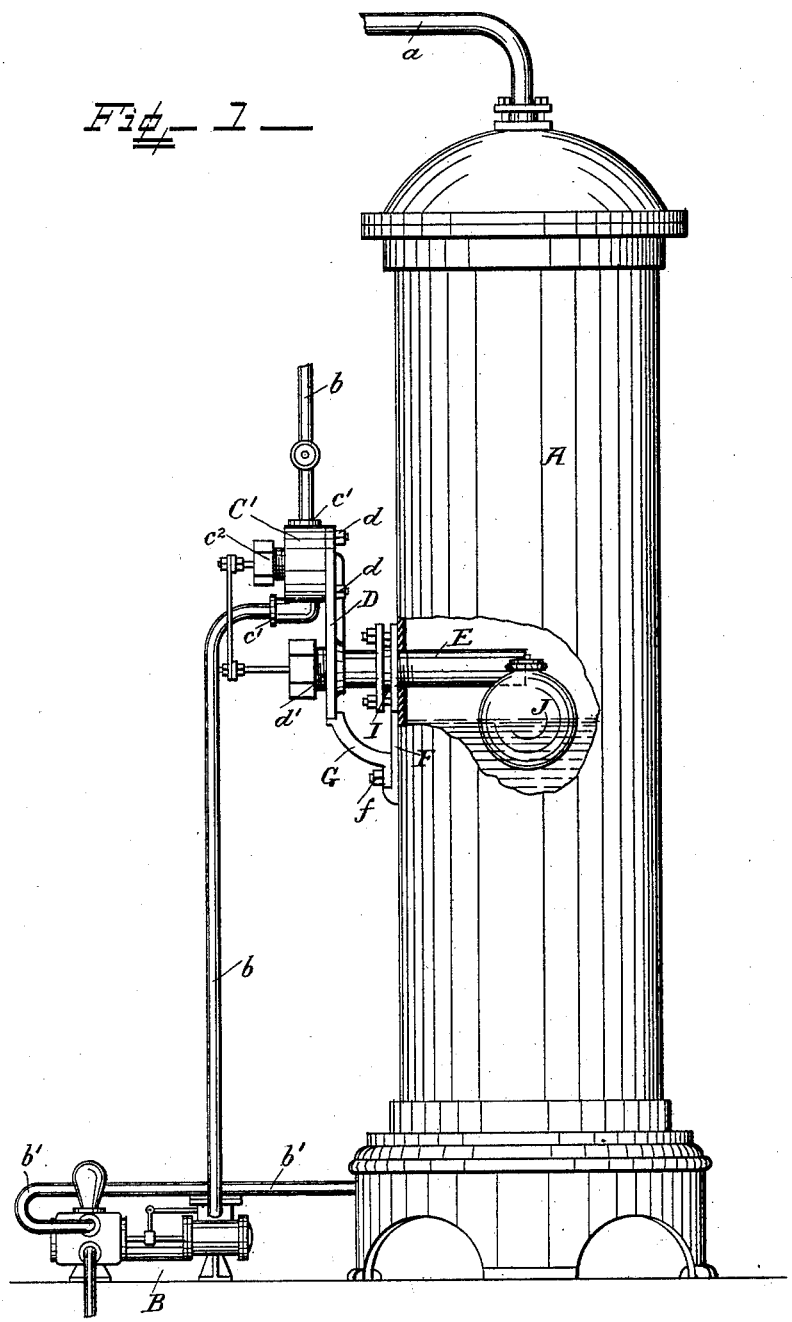

(No Model.) 2 Sheets—Sheet 2.
W. T. HILDRUP, Jr.
REGULATING THE SUPPLY OF LIQUIDS TO RETORTS OR GAS GENERATORS.
No. 362,081. Patented May 3, 1887.
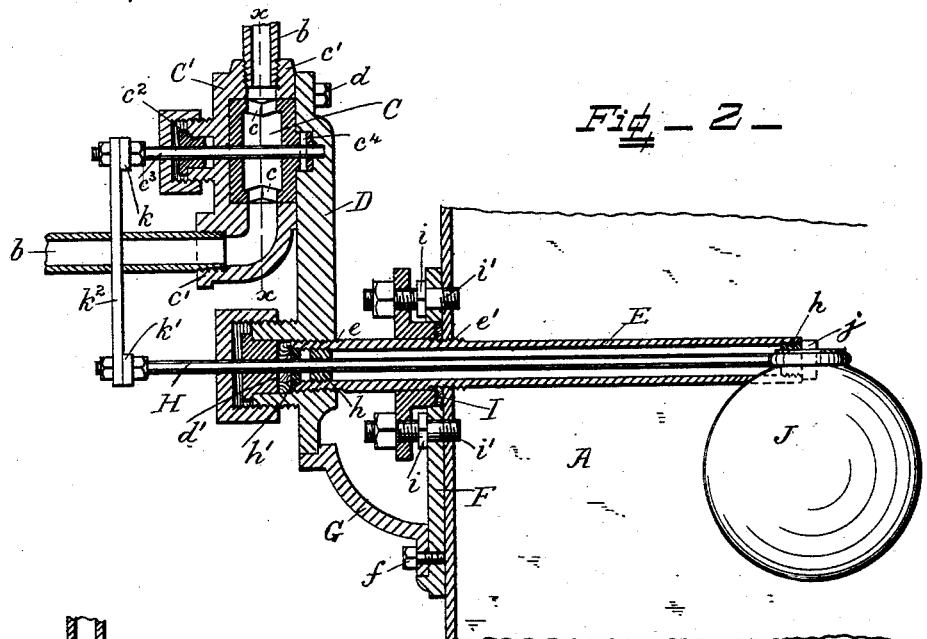
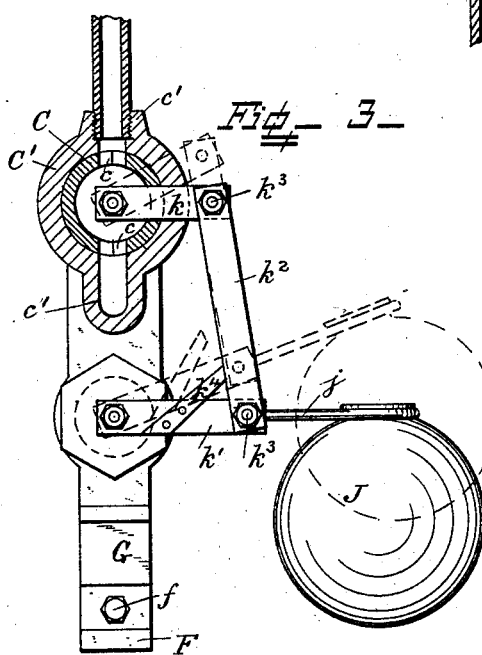
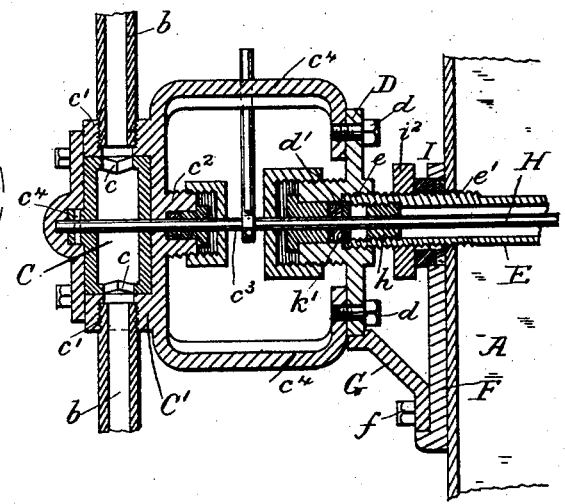
Witnesses
E. Morris.
L. B. Porter.
Inventor
W. T. Hildrup, Jr.
By his Attorney
Herbert W. T. Jenner.

UNITED STATES PATENT OFFICE.

WILLIAM T. HILDRUP, JR., OF HARRISBURG, PENNSYLVANIA.

REGULATING THE SUPPLY OF LIQUID TO RETORTS OR GAS-GENERATORS.

SPECIFICATION forming part of Letters Patent No. 362,081, dated May 3, 1887.

Application filed January 24, 1887. Serial No. 225,385. (No model.)

*To all whom it may concern:*

Be it known that I, WILLIAM T. HILDRUP, Jr., a citizen of the United States, residing at Harrisburg, in the county of Dauphin and State of Pennsylvania, have invented certain new and useful Improvements in Automatic Steam Throttle-Valves for Regulating the Supply of Liquid to Ice-Machine Retorts or Gas-Generators; and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automatic steam throttle-valves for regulating the supply of liquid to ice-machine retorts; and it consists in the novel construction and combination of the parts hereinafter fully described and claimed. This throttle-valve is specially adapted to the retorts of ice-machines which work on the absorption method. In these machines a quantity of strong aqua-ammonia or other similar liquid is heated in a retort, and the gas driven off from it by the heat is afterward cooled and liquefied. The subsequent expansion of this liquid to a gaseous condition in the refrigerating-coils produces the required degree of cold, and the expanded gas is afterward used to enrich cool weak aqua-ammonia, and pumped back into the retort.

The object of the present invention is to provide an automatic device which shall keep the liquid in the retort at as nearly uniform a level as possible.

In the drawings, Figure 1 is a side view of a retort, partly in section, and a steam-pump for the liquid, provided with the automatic throttle-valve for regulating its action. Fig. 2 is a side view showing the throttle-valve in section through the center. Fig. 3 is an end view of the throttle-valve, partly in section, on the line $x\,x$ in Fig. 2. Fig. 4 is a sectional side view through the center of the throttle-valve, showing a modification of the invention.

A is the retort, provided with an internal steam-coil or other equivalent device for heating the aqua-ammonia; and $a$ is the outlet-pipe for the gas.

B is a steam-pump provided with the steam-pipe $b$, connected to its steam-cylinder, and with the delivery-pipe $b'$, connecting its pump-barrel with the retort or gas-generator A. The steam-pump shown is direct acting; but a separate engine and pump can be used, if desired, and connected together by a belt or other equivalent device.

C is the throttle-valve, by preference a plain cylindrical balanced valve, having ports $c$.

C' is the throttle-valve casing, provided with attachments $c'\,c'$ for the steam-pipe $b$ on opposite sides of the valve C. A stuffing-box, $c^2$, is provided on the casing C', and the valve-stem $c^3$ passes through this stuffing-box and is secured to the valve by the pin $c^4$.

D is a plate, to which the casing C' is secured by the bolts $d$.

E is a tubular extension-piece secured at one end to the plate D by the screw-thread $e$, and provided with the screw-thread $e'$, which engages with a correspondingly screw-threaded hole in the side of the retort A.

F is a plate held against the outside of the retort, and G is a bracket fastened to the plate F by the bolt $f$ and supporting the lower part of plate D.

H is a rod journaled in the plugs $h$ in the ends of the tubular extension-piece E and projecting through the stuffing-box $d'$, formed on plate D, so that there may be no leak of gas from inside the retort or gas-generator through the tubular extension-piece. A small plate, $h'$, is inserted, as shown, to form the bottom of the stuffing-box $d'$.

I is a stuffing-box, through which the tubular entension-piece passes and which prevents the leak of gas around the outside of it from inside the retort.

J is a float, which bears upon the surface of the liquid in the retort or gas-generator, and $j$ is a lever, secured upon the end of rod H, for carrying the said float.

In Fig. 3 the plate F is shown secured to the retort by the thin nuts $i$ and the studs $i'$, which also afford a means for tightening up the follower of the stuffing-box by nuts in the usual manner.

In the modification shown in Fig. 4 the studs are dispensed with. The screw-thread $e'$ is continued farther along the extension-piece, and a plate, $i^2$, is screwed upon it and performs the double office of tightening up the stuffing-box follower, which is reduced to a simple ring, and keeping the plate F in position.

In Fig. 3 the valve-stem $c^3$ has a lever, $k$, secured upon it, and the rod H has a lever, $k'$, also secured upon it. The free ends of these levers are pivotally connected by the link $k^2$ and pins $k^3$. A stop, $k^4$, is bolted to lever $k'$ and bears upon the link $k^2$, and thus arrests the downward movement of the float when the throttle-valve is wide open.

In the modification shown in Fig. 4 the valve-stem $c^3$ is directly connected to the rod H, the two parts being formed in one piece or otherwise securely coupled together. In this case the stop which arrests the downward movement of the float is fastened upon the stem $c^3$ or rod H and strikes against one of the projections $c^4$, which form a part of the casing C' and allow it to be bolted to the plate D, so as to leave plenty of room for the nuts of the stuffing-boxes $d'$ and $c^2$.

The operation of the throttle-valve is as follows: Steam is admitted to the steam-cylinder of the pump through the pipe $b$, and the liquid is pumped into the retort or gas-generator in the ordinary manner. When too much liquid is pumped in and the level of it rises in the retort or gas-generator, the float lifts, as indicated by the dotted lines in Fig. 2, and the supply of steam for working the pump is diminished until the float descends and opens the steam-valve wider.

What I claim is—

1. The combination of a balanced throttle-valve provided with a stem, a valve-casing provided with a stuffing-box for the valve-stem, and connections for the steam-supply pipe, a plate bolted to the valve-casing, a tubular extension-piece secured to the said plate and projecting through the side of the retort or gas-generator, a rod journaled in the tubular extension-piece and connected to the valve-stem, a lever secured on the end of the rod inside the retort or gas-generator, and a float connected to the end of the said lever, so that the supply of steam may be automatically regulated and the liquid in the retort or gas-generator kept at a uniform level, substantially as set forth.

2. The combination of a balanced throttle-valve provided with a stem, a valve-casing provided with a stuffing-box for the valve-stem, and connections for the steam-supply pipe, a plate bolted to the valve-casing, a tubular extension-piece secured to the said plate and projecting through the side of the retort or gas-generator, a rod journaled in the tubular extension-piece and connected to the valve-stem, a lever secured on the end of the rod inside the retort or gas-generator, a float connected to the end of the said lever, and a stop for arresting the downward movement of the float when the throttle-valve is wide open, substantially as and for the purpose set forth.

3. The combination of a balanced throttle-valve provided with a stem, a valve-casing provided with a stuffing-box for the valve-stem, and connections for the steam-supply pipe, the plate D, bolted to the valve-casing, a tubular extension-piece secured to the said plate and projecting through the side of the retort or gas-generator, the plate F, provided with a stuffing-box for the tubular extension-piece, the bracket G, a rod journaled in the tubular extension-piece and connected to the valve-stem, a stuffing-box for the said rod, and a lever and float secured to the end of the rod inside the retort or gas-generator, substantially as and for the purpose set forth.

4. The combination of a balanced throttle-valve provided with a stem, a valve-casing provided with a stuffing-box for the valve-stem, and connections for the steam-supply pipe, the plate D, bolted to the valve-casing, a tubular extension-piece secured to the said plate and projecting through the side of the retort or gas-generator, the plate F, provided with a stuffing-box for the tubular extension-piece, the plate $i'$, screwed upon the tubular extension-piece, the bracket G, a rod journaled in the tubular extension-piece and connected to the valve-stem, a stuffing-box for the said rod, and the lever and float secured to the end of the rod inside the retort or gas-generator, substantially as and for the purpose set forth.

5. The combination of a balanced throttle-valve provided with a stem, a valve-casing provided with a stuffing-box for the valve-stem, and connections for the steam-supply pipe, the plate D, bolted to the valve-casing, a tubular extension-piece secured to the said plate and projecting through the side of the retort or gas-generator, the plate F, provided with a stuffing-box for the tubular extension-piece, the bracket G, a rod journaled in the tubular extension-piece, a lever secured upon the end of the rod, a lever secured upon the end of the valve-stem, a link pivotally connecting the free ends of the said levers, a stuffing-box for the said rod, and the lever and float secured to the end of the rod inside the retort or gas-generator, substantially as and for the purpose set forth.

In testimony whereof I affix my signature in presence of two witnesses.

WILLIAM T. HILDRUP, Jr.

Witnesses:
CHRISTIAN W. LYNCH,
R. S. CARE.